United States Patent
Jones et al.

(10) Patent No.: US 8,140,636 B2
(45) Date of Patent: Mar. 20, 2012

(54) INSTANT MESSENGER SUBSET MANAGEMENT

(75) Inventors: Doris L. Jones, Somerville, MA (US);
Ruthie D. Lyle, Durham, NC (US);
Corinne M. Ryan, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 11/964,395

(22) Filed: Dec. 26, 2007

(65) Prior Publication Data

US 2009/0172104 A1 Jul. 2, 2009

(51) Int. Cl.
*G06F 15/16* (2006.01)

(52) U.S. Cl. ......... 709/207; 709/205

(58) Field of Classification Search ........ 709/205–207
See application file for complete search history.

(56) References Cited

U.S. PATENT DOCUMENTS

| | | | |
|---|---|---|---|
| 6,212,548 B1 * | 4/2001 | DeSimone et al. | 709/204 |
| 6,557,027 B1 * | 4/2003 | Cragun | 709/204 |
| 7,200,635 B2 * | 4/2007 | Yashchin et al. | 709/206 |
| 7,661,067 B2 * | 2/2010 | Chen et al. | 715/752 |
| 2003/0030670 A1 * | 2/2003 | Duarte et al. | 345/758 |
| 2003/0233265 A1 * | 12/2003 | Lee et al. | 705/8 |
| 2007/0174404 A1 * | 7/2007 | Hui et al. | 709/207 |
| 2008/0071868 A1 * | 3/2008 | Arenburg et al. | 709/206 |
| 2008/0256190 A1 * | 10/2008 | Ryan et al. | 709/206 |
| 2008/0263165 A1 * | 10/2008 | Hui et al. | 709/206 |
| 2009/0216851 A1 * | 8/2009 | Digate et al. | 709/206 |

* cited by examiner

*Primary Examiner* — Hussein Elchanti
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to instant messaging and provide a method, system and computer program product for instant messenger subset management. In an embodiment of the invention, an instant messenger subset management method can be provided. The method can include selecting a set of names for different open chat sessions of an instant messenger, providing a single responsive posting to the selected set, and persisting the set for subsequent processing. Additionally, the method can include annotating the single responsive posting in a chat log to indicate the names in the selected set having received the single responsive posting.

15 Claims, 1 Drawing Sheet

INSTANT MESSENGER SUBSET MANAGEMENT

REFERENCE TO CO-PENDING APPLICATIONS FOR PATENT

The present application is related to and hereby claims priority as a continuation-in-part to the following co-assigned U.S. patent application, which is expressly incorporated by reference herein: U.S. application Ser. No. 11/780,753 filed on Jul. 20, 2007.

BACKGROUND OF THE INVENTION

1. Field of the Invention

The present invention relates to the field of collaborative computing and more particularly to instant messaging.

2. Description of the Related Art

Instant messaging as a technology provides the backbone of real time communications amongst collaborators. Though the notion of real time communications harkens back before the days of the World Wide Web to a citizens band radio analog for computer communications, instant messaging as a technology only has begun to come into its own in the past several years. Originally, instant messaging was limited only to the basic exchange of text messages within a dashboard display of messages. As the technology has matured, though, additional functionality has been added including the integration of voice and video into chat sessions.

Instant messaging has proven to be an invaluable tool in the corporate environment linking remote workers engaging in collaborative work without requiring those remote workers to engage in wasteful telephonic conversation or to wait out e-mail responses from others who may or may not actively scan respective e-mail inboxes. Instant messaging provides the added benefit of optimally accommodating very short messages such that an exchange of instant messages, often referred to as a chat, can be direct and to the point. As such, instant messaging has proven to be helpful in the exchange of important information in a timely manner.

The nature of instant messaging, however, is not without fault. In this regard, instant messaging provides such easy instant communications amongst different collaborators, oftentimes, too many instant messaging sessions can arise at once. When too many instant messaging sessions open in a short period of time, managing responses to the sessions can be overwhelming. Consequently, the efficiencies gained by instant messaging in ordinary circumstances can be defeated from time to time by an overflow of open instant messaging sessions and the responsibility to manage each open instant messaging session.

In presently co-pending U.S. patent application Ser. No. 11/780,753, multiple different open instant messaging sessions can be handled in group in a response. Specifically, different open instant messaging sessions can be selected for group processing and a single responsive posting can be applied to each individual one of the open instant messaging sessions. In consequence, greater efficiencies can be attained by treating the open instant messaging sessions unitarily.

BRIEF SUMMARY OF THE INVENTION

Embodiments of the present invention address deficiencies of the art in respect to instant messaging and provide a novel and non-obvious method, system and computer program product for instant messenger subset management. In an embodiment of the invention, an instant messenger subset management method can be provided. The method can include selecting a set of names for different open chat sessions of an instant messenger, providing a single responsive posting to the selected set, and persisting the set for subsequent processing. Additionally, the method can include annotating the single responsive posting in a chat log to indicate the names in the selected set having received the single responsive posting.

In one aspect of the embodiment, persisting the set for subsequent processing can include adding a to-do in a to-do list to provide an additional responsive posting to the names in the selected set. In another aspect of the embodiment, persisting the set for subsequent processing can include adding an instant messenger reminder to provide an additional responsive posting to the names in the selected set. In yet another aspect of the embodiment, persisting the set for subsequent processing can include keeping a console open to provide an additional responsive posting to the names in the selected set. In even yet another aspect of the embodiment, persisting the set for subsequent processing can include adding the selected set of names as a group in the instant messenger. Finally, persisting the set for subsequent processing, can include setting a follow-up to provide an additional responsive posting to the names in the selected set.

In another embodiment of the invention, an instant messaging data processing system can include a chat server configured for coupling to a plurality of chat clients over a computer communications network. The system further can include subset management logic communicatively coupled to the chat clients. The subset management logic can reside in the chat server, the individual chat clients or both and can include program code enabled to select a set of names for different open chat sessions of an instant messenger, to provide a single responsive posting to the selected set, and to persist the set for subsequent processing.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for instant messenger subset management. In accordance with an embodiment of the present invention, a set of different open chat sessions can be selected for group processing of a responsive posting. The set of the different open chat sessions can be persisted for subsequent processing as a reminder. The reminder can include creating a to-do in a to-do list for responding to the different open chat sessions, keeping a console open to respond to the different open chat sessions with a single responsive posting, adding names of collaborators for the respectively different open chat sessions to a group in the instant messenger, and establishing a follow-up entry for responding to the different open chat sessions. Finally, the single responsive posting can be annotated in a chat log for each of the different open chat sessions to indicate handling of the responsive posting according to instant messenger subset management.

Figures 1A, 1B:
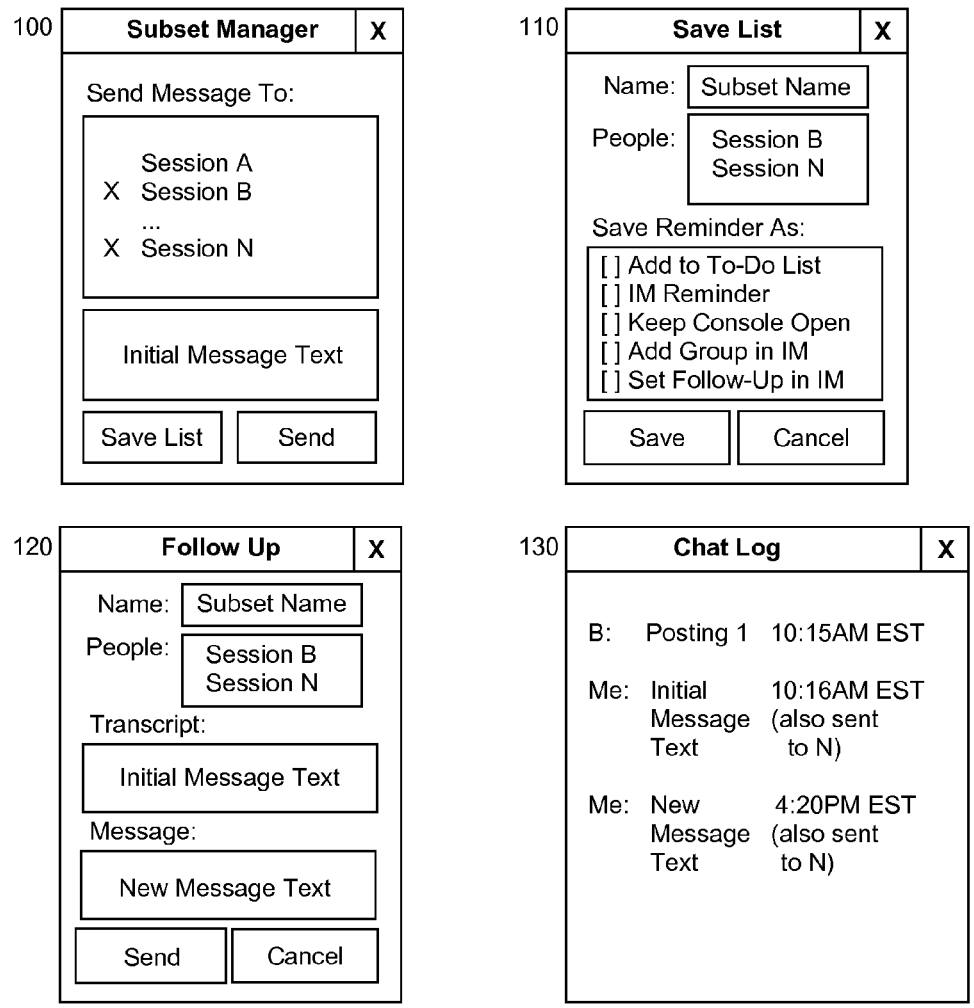
FIGS. 1A and 1B, taken together, are a pictorial illustration of a user interface configured for instant messenger subset management; and, FIG. 2 is a schematic illustration of an instant messaging data processing system configured for instant messenger subset management.

In illustration, FIGS. 1A and 1B, taken together, pictorially depict a user interface configured for instant messenger subset management. As shown in FIG. 1A, a subset manager 100 can be provided. The subset manager 100 can be invoked in response to multiple different open instant messaging sessions and can provide a selectable listing of the open instant messaging sessions in addition to a text entry field into which a singular responsive posting can be provided for delivery to selected names for corresponding selected ones of the open instant messaging sessions. Notably, the subset manager 100 can permit the persistence of the selected names for subsequent processing.

Responsive to requesting the persistence of a selection of names for subsequent processing in the subset manager, a save list dialog 110 can be provided. The save list dialog 110 can permit the persistence of the selection of names in connection with a number of different types of reminders. For example, a reminder can be established as an entry in a to-do list to respond to the names with corresponding instant messages with the singular responsive posting. Further, the reminder can be established through the maintained visibility of the subset manager. Yet further, the reminder can be established as a follow-up entry with the singular responsive posting. Finally, the selection of names can be added as a group to either the instant messenger or a collaborative server.

A follow up dialog 120 can be provided when the reminder is a follow-up. The follow up dialog 120 can provide an identifier for the persisted selection of names and a view of the persisted selection of names. Also, the follow up dialog 120 can provide a view to the singular responsive posting and also a text entry field to provide message text for an additional singular responsive posting. Finally, the follow up dialog 120 can permit the transmission of the additional singular responsive posting to each of the persisted selection of names though in different chat sessions. As such, referring to FIG. 1B, a chat log 130 can indicate for the singular responsive postings that that the singular responsive postings had been transmitted to the persisted selection of names in different chat sessions.

Figure 2:
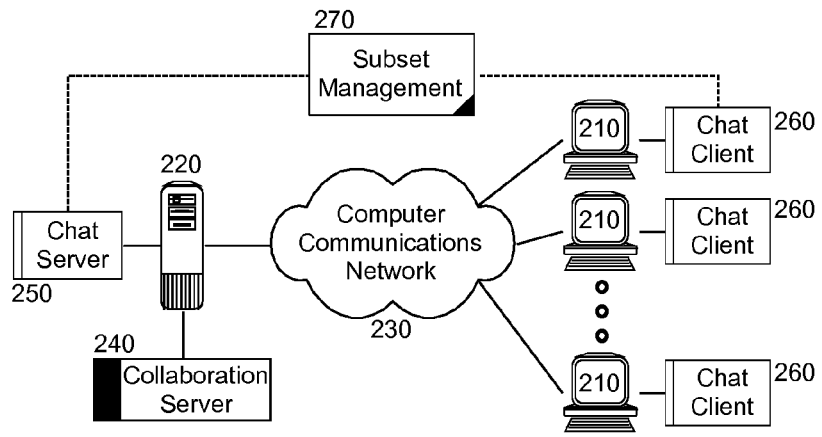

The process described in connection with FIGS. 1A and 1B can be implemented in an instant messaging data processing system. In further illustration, FIG. 2 schematically depicts an instant messaging data processing system configured for instant messenger subset management. The system can include a host server 220 communicatively coupled to multiple different computing devices 210 over computer communications network 230. The host server 220 can be configured to support the operation of a chat server 250 managing one or more chat sessions amongst different chat clients 260, each executing in a corresponding one of the computing devices 210.

Notably, subset management logic 270 can be coupled to either or both of the chat server 250 and the chat clients 260.

The subset management logic 270 can include program code enabled to permit the selection of one or more open chat sessions viewed through a chat client 260 and the grouping of the selection to receive a single responsive posting. The program code of the subset management logic 270 further can be enabled to persist the selection for subsequent processing including establishing a reminder for the selection and annotating the single responsive posting to indicate which users have received the single responsive posting.

It is to be recognized by the skilled artisan that the subset management logic 270 can be wholly incorporated in or coupled to the chat clients 260. Just the same the subset management logic 270 can be wholly incorporated in or coupled to the chat server 250 and in communication with and accessible from the chat clients 260. Yet further, the subset management logic 270 can be incorporated partially within the chat server 250 and partially within the chat clients 260.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An instant messenger subset management method comprising:

selecting, by a processor of a chat server, a set of names for different open chat sessions of an instant messenger;

providing, using the processor, a single responsive posting to the selected set; and, persisting the set for subsequent processing.

2. The method of claim 1, wherein persisting the set for subsequent processing, comprises adding a to-do in a to-do list to provide an additional responsive posting to the names in the selected set.

3. The method of claim 1, wherein persisting the set for subsequent processing, comprises adding an instant messenger reminder to provide an additional responsive posting to the names in the selected set.

4. The method of claim 1, wherein persisting the set for subsequent processing, comprises keeping a console open to provide an additional responsive posting to the names in the selected set.

5. The method of claim 1, wherein persisting the set for subsequent processing, comprises adding the selected set of names as a group in the instant messenger.

6. The method of claim 1, wherein persisting the set for subsequent processing, comprises setting a follow-up to provide an additional responsive posting to the names in the selected set.

7. The method of claim 1, further comprising annotating the single responsive posting in a chat log to indicate the names in the selected set having received the single responsive posting.

8. An instant messaging data processing system comprising:
a chat server having a processor and a computer readable storage memory, the chat server configured for coupling to a plurality of chat clients over a computer communications network; and,
subset management logic, executing in the computer readable storage memory by the processor, and communicatively coupled to the chat clients comprising program code enabled to select a set of names for different open chat sessions of an instant messenger, to provide a single responsive posting to the selected set, and to persist the set for subsequent processing.

9. A computer program product comprising a computer usable storage medium having stored therein instructions for enabling a computer system to manage an instant messenger subset, the instructions, when executed on a computer, instruct the computer to perform the operations comprising:
selecting a set of names for different open chat sessions of an instant messenger;
providing a single responsive posting to the selected set; and,
persisting the set for subsequent processing.

10. The computer program product of claim 9, wherein persisting the set for subsequent processing, comprises adding a to-do in a to-do list to provide an additional responsive posting to the names in the selected set.

11. The computer program product of claim 9, wherein persisting the set for subsequent processing, comprises adding an instant messenger reminder to provide an additional responsive posting to the names in the selected set.

12. The computer program product of claim 9, wherein persisting the set for subsequent processing, comprises keeping a console open to provide an additional responsive posting to the names in the selected set.

13. The computer program product of claim 9, wherein persisting the set for subsequent processing, comprises adding the selected set of names as a group in the instant messenger.

14. The computer program product of claim 9, wherein persisting the set for subsequent processing, comprises setting a follow-up to provide an additional responsive posting to the names in the selected set.

15. The computer program product of claim 9, further comprises annotating the single responsive posting in a chat log to indicate the names in the selected set having received the single responsive posting.

* * * * *